US009666361B2

(12) United States Patent
Takayama et al.

(10) Patent No.: US 9,666,361 B2
(45) Date of Patent: May 30, 2017

(54) RARE-EARTH BOND MAGNET MANUFACTURING METHOD

(75) Inventors: Kazuhiro Takayama, Osaka (JP); Toshio Miyoshi, Osaka (JP)

(73) Assignee: HITACHI METALS, LTD., Tokyo (JP)

(*) Notice: Subject to any disclaimer, the term of this patent is extended or adjusted under 35 U.S.C. 154(b) by 179 days.

(21) Appl. No.: 13/985,152

(22) PCT Filed: Feb. 27, 2012

(86) PCT No.: PCT/JP2012/054735
§ 371 (c)(1),
(2), (4) Date: Aug. 13, 2013

(87) PCT Pub. No.: WO2012/118001
PCT Pub. Date: Sep. 7, 2012

(65) Prior Publication Data
US 2013/0323109 A1 Dec. 5, 2013

(30) Foreign Application Priority Data
Mar. 2, 2011 (JP) ................................ 2011-044998

(51) Int. Cl.
H01F 41/02 (2006.01)
H01F 41/00 (2006.01)
(Continued)

(52) U.S. Cl.
CPC ............ *H01F 41/0246* (2013.01); *B22F 1/02* (2013.01); *B22F 3/02* (2013.01); *B23K 35/0244* (2013.01);
(Continued)

(58) Field of Classification Search
CPC ..... H01F 41/0246; H01F 1/0578; B22F 9/008
See application file for complete search history.

(56) References Cited

U.S. PATENT DOCUMENTS 4,802,931 A  2/1989  Croat
4,902,361 A * 2/1990  Lee ....................... H01F 1/0578
                                                    148/302
(Continued)

FOREIGN PATENT DOCUMENTS

JP  06-302418 A  10/1994
JP  09-205013 A   8/1997
(Continued)

OTHER PUBLICATIONS

Hamada, N., C. Mishima, H. Mitarai, and Y. Honkura. "Development of Nd—Fe—B Anisotropic Bonded Magnet with 27 MGOe." IEEE Transactions on Magnetics IEEE Trans. Magn. 39.5 (2003): 2953-955. IEEE Xplore. Web. May 27, 2015.*
(Continued)

*Primary Examiner* — Jessee Roe
*Assistant Examiner* — Jeremy Jones
(74) *Attorney, Agent, or Firm* — Keating & Bennett, LLP

(57) ABSTRACT

A method for producing a bonded rare-earth magnet according to an embodiment of the present invention includes the steps of: providing a rapidly solidified rare-earth magnet alloy powder; providing a solution in which a resin that is in solid phase at an ordinary temperature is dissolved in an organic solvent; mulling the rapidly solidified rare-earth magnet alloy powder and the solution together and vaporizing the organic solvent, thereby making a bonded rare-earth magnet compound in which magnet powder particles that form the rapidly solidified rare-earth magnet alloy powder are coated with the resin; making a compressed compact by compressing the bonded rare-earth magnet compound under a pressure of 1000 MPa to 2500 MPa; and thermally treating the compressed compact. If the rapidly solidified rare-earth magnet alloy powder to be mulled is 100 mass %, the solution includes 0.4 mass % to 1.0 mass (Continued)

% of the resin and 1.2 mass % to 20 mass % of the organic solvent.

8 Claims, 7 Drawing Sheets

(51) Int. Cl.
| | |
|---|---|
| H01F 7/00 | (2006.01) |
| H01F 7/02 | (2006.01) |
| H01F 1/053 | (2006.01) |
| B22F 1/02 | (2006.01) |
| B22F 3/02 | (2006.01) |
| C22C 1/04 | (2006.01) |
| C22C 28/00 | (2006.01) |
| B23K 35/36 | (2006.01) |
| B23K 35/02 | (2006.01) |
| H01F 1/057 | (2006.01) |
| H01F 1/055 | (2006.01) |

(52) U.S. Cl.
CPC .......... B23K 35/3613 (2013.01); C22C 1/04 (2013.01); C22C 28/00 (2013.01); H01F 1/0578 (2013.01); H01F 41/005 (2013.01); H01F 41/0266 (2013.01); *B22F 2304/10* (2013.01); *H01F 1/0558* (2013.01)

(56) References Cited

U.S. PATENT DOCUMENTS

| | | | | |
|---|---|---|---|---|
| 6,001,272 | A * | 12/1999 | Ikuma | B82Y 25/00 252/62.54 |
| 6,494,968 | B1 * | 12/2002 | Hamano | B22F 9/082 148/101 |
| 2001/0015239 | A1 * | 8/2001 | Kanekiyo | B82Y 25/00 148/104 |
| 2002/0036032 | A1 * | 3/2002 | Arai | B82Y 25/00 148/302 |
| 2004/0079449 | A1 * | 4/2004 | Kanekiyo | B22F 3/225 148/302 |
| 2009/0127494 | A1 | 5/2009 | Kanekiyo et al. | |
| 2009/0129966 | A1 | 5/2009 | Kanekiyo et al. | |
| 2009/0223606 | A1 | 9/2009 | Kanekiyo et al. | |
| 2010/0245006 | A1 | 9/2010 | Menjo et al. | |
| 2012/0021221 | A1 * | 1/2012 | Miyoshi | B82Y 25/00 428/402 |

FOREIGN PATENT DOCUMENTS

| | | | |
|---|---|---|---|
| JP | 09205013 A | * | 8/1997 |
| JP | 11-312617 A | | 11/1999 |
| JP | 2008-108784 A | | 5/2008 |
| JP | 2008108784 A | * | 5/2008 |

OTHER PUBLICATIONS

English translation of Official Communication issued in corresponding International Application PCT/JP2012/054735, mailed on Sep. 19, 2013.
Official Communication issued in International Patent Application No. PCT/JP2012/054735, mailed on May 29, 2012.

* cited by examiner

FIG.2
(a) 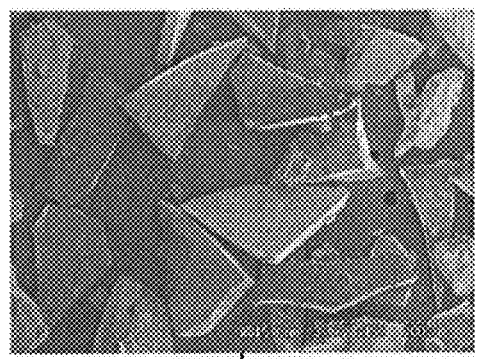
(b) 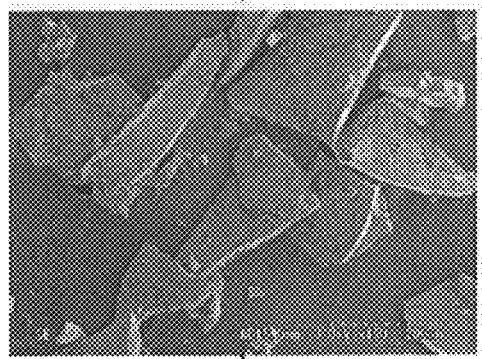
(c) 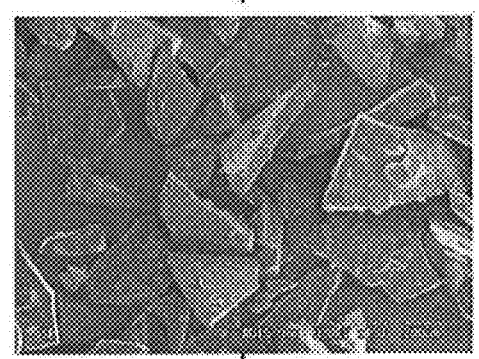
(d) 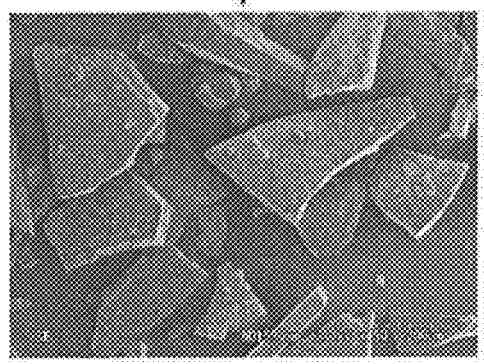

FIG.5
(a) 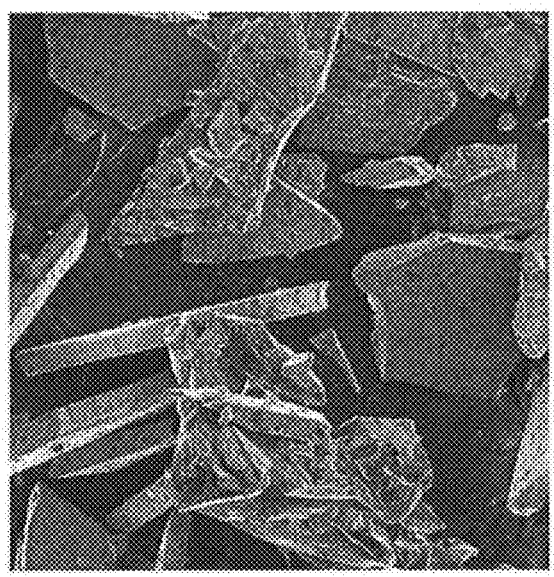
(b) 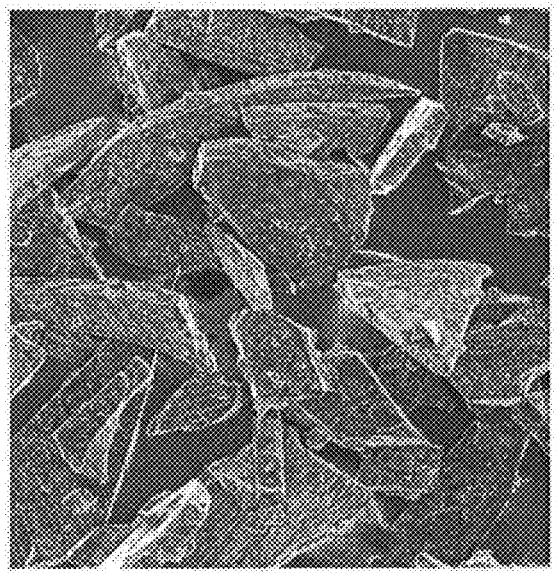

*FIG.6*
(a) 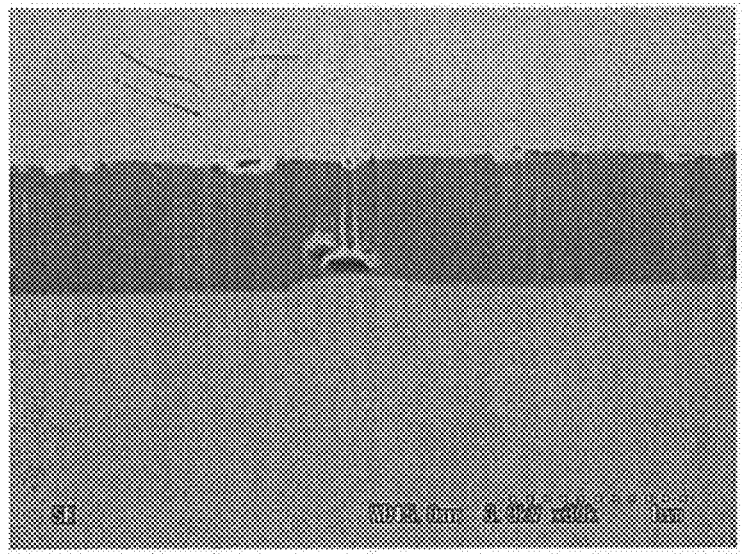
(b) 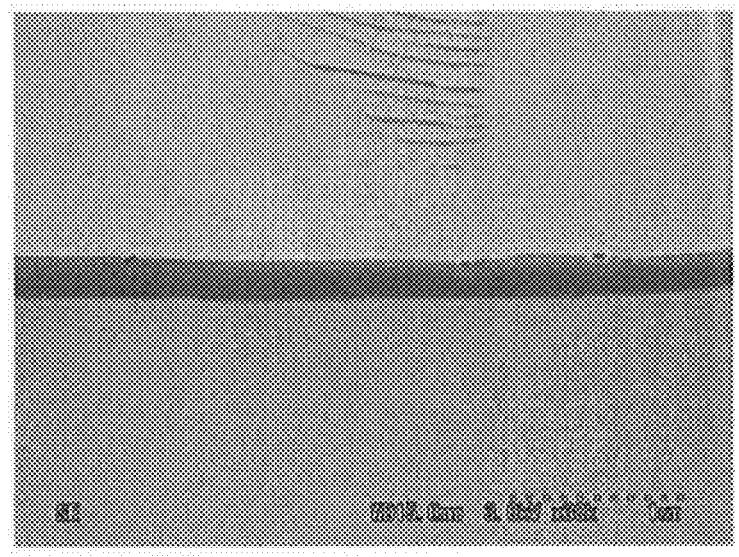

*FIG. 7*
(a)
No.1
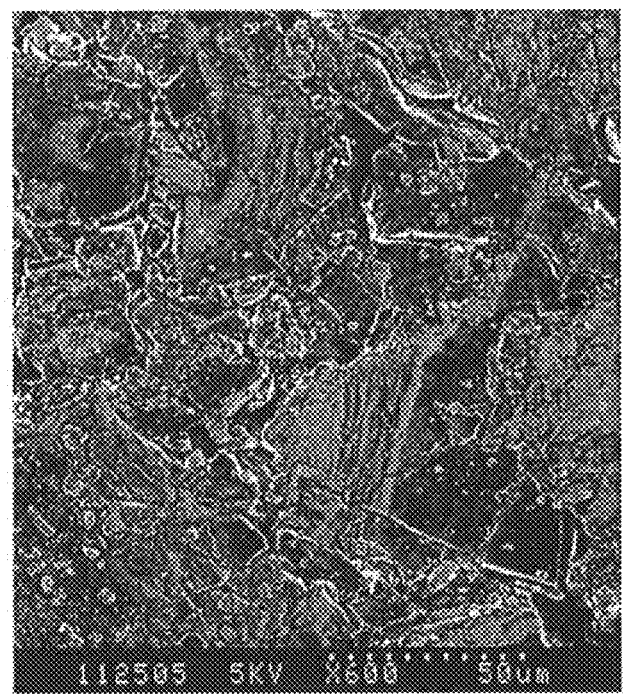
(b)
No.11
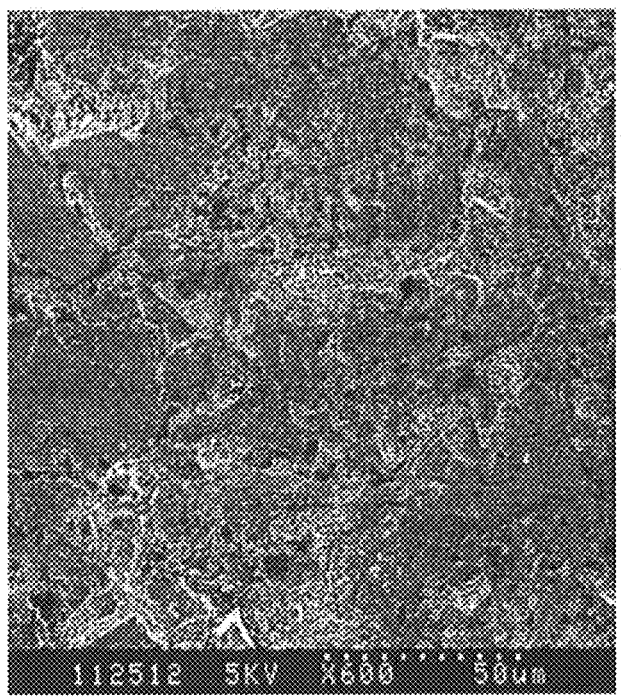

RARE-EARTH BOND MAGNET MANUFACTURING METHOD

TECHNICAL FIELD

The present invention relates to a method for producing a highly productive bonded rare-earth magnet which has a magnet density that is high enough to exhibit excellent magnetic properties and which also has practical strength and high electrical resistance.

BACKGROUND ART

Permanent rare-earth magnets have magnetic properties that are high enough to use them in various fields today. Those permanent rare-earth magnets are roughly classifiable into sintered magnets and bonded magnets according to the material powder to use and the manufacturing method. A bonded rare-earth magnet (which will be simply referred to herein as a "bonded magnet") can be formed in any shape more flexibly than a sintered rare-earth magnet. In addition, as there is an insulator resin between the magnet powder particles of a bonded magnet, the bonded magnet has high electrical resistance, which is beneficial. On top of that, since a nanocomposite magnet powder which requires approximately two-thirds as large an amount of rare-earth metal as a sintered rare-earth magnet does may be used, such a bonded magnet is expected to attract more and more attention from now on as a permanent magnet that can save the amount of the rare-earth metal to use.

However, a bonded magnet includes a resin binder, and therefore, its magnet density is lower than an alloy true density (of 7.6 g/cm$^3$, for example). And even a compressed bonded magnet, which generally has a small amount of resin binder, has a magnet density of 5.5 to 6.2 g/cm$^3$ (which accounts for approximately 72 to 82% of the alloy true density). As a result, the magnetic properties of a bonded magnet cannot but be lower than those of a sintered rare-earth magnet.

A binderless magnet which is obtained by binding a magnet powder of a rapidly solidified rare-earth alloy (which will be simply referred to herein as a "magnet powder") through a cold compression process under an ultrahigh pressure of 500 to 2500 MPa without using any resin binder was developed recently and disclosed in Patent Document No. 1. The binderless magnet disclosed in Patent Document No. 1 is said to have a density of 5.5 to 7.0 g/cm$^3$ (which accounts for approximately 72 to 92% of the alloy true density). The binderless magnet includes no resin binder, and therefore, includes a magnet powder at a higher volume percentage than a bonded magnet does. Consequently, the binderless magnet can be expected to achieve magnetic properties that have never been realized by any bonded magnet.

To make a binderless magnet, however, the magnet powder needs to be subjected to the cold compression process and then thermally treated at a temperature of 350° C. to 800° C. so as to get sintered. Its magnetic properties actually deteriorate as a result of this heat treatment, and it is difficult to realize the magnetic properties just as intended. On top of that, in the binderless magnet, its magnet powder particles are bound together by producing solid-phase diffusion of atoms through the heat treatment at such a low temperature, and therefore, high mechanical strength cannot be obtained and its use will be a limited one. Furthermore, the binderless magnet uses no resin, and therefore, cannot achieve as high electrical resistance as the one achieved by a bonded magnet.

Patent Document No. 2 discloses a compressed bonded magnet which uses, as a resin binder, a resin that is in liquid phase at an ordinary temperature. Patent Document No. 2 says that a high-density bonded magnet can be obtained by using a magnet powder with good flowability and a particle body made of such a liquid resin binder. In an example of Patent Document No. 2, its density falls within the range of 6.2 to 6.4 g/cm$^3$. However, since such a liquid resin is so difficult to handle that the productivity tends to be very low, it is hard to apply the method of Patent Document No. 2 to mass production.

Patent Document No. 3 says that if a solid resin is dissolved in an organic solvent an used when a compound is made during the manufacturing process of a bonded magnet, the surface of the magnet powder can be uniformly coated with the resin. Patent Document No. 3 also says that by compressing such a compound, a bonded magnet with excellent magnetic properties, mechanical strength, thermal resistance and corrosion resistance can be obtained. Patent Document No. 3 discloses a bonded magnet with a relatively high magnet density. In an example of Patent Document No. 3, the maximum magnet density is 6.3 g/cm$^3$. According to Patent Document No. 3, however, to improve the magnetic properties, it is effective to increase the volume percentage of the magnet powder and, decrease the percentage of the resin accordingly. Nevertheless, Patent Document No. 3 also says that the percentage of the resin cannot be reduced to less than a certain limit considering the compactability and mechanical strength of the bonded magnet. And since the bonded magnet of Patent Document No. 3 includes 1.5 to 2.0 mass % of resin with respect to the magnet powder, it is difficult to achieve an even higher magnet density.

CITATION LIST

Patent Literature

Patent Document No, 1: PCT International Application Publication No. 2007/018123

Patent Document No. 2: Japanese Laid-Open Patent Publication No. 11-312617

Patent Document No. 3: Japanese Laid-Open Patent Publication No. 6-302418

SUMMARY OF INVENTION

Technical Problem

To increase the density of a magnet, either the content of the resin or the voids of a compact to be obtained by compression and compaction should be reduced as described in Patent Document No. 3. One imaginable method for reducing the voids of a compact is to raise the compacting pressure. Thus, the present inventors tentatively raised the compacting pressure in a conventional method for producing a bonded magnet. Specifically, a compound that had been used in a conventional manufacturing process, e.g., a compound made by the same method as what is disclosed in Patent Document No. 3, was compressed and compacted at a compacting pressure of 1960 MPa, which is approximately as high as the compression condition for the binderless magnet disclosed in Patent Document No. 1. However, even though the bonded magnet had been made under such a condition including that high compacting pressure, an intended magnet density could not be achieved.

The present inventors also tentatively set the content of resin in a bonded magnet to be 1 mass % or less. In that case, however, even if the compacting pressure was raised to as high as 1960 MPa, a practical mechanical strength could not be achieved and the electrical resistance was low, too.

Thus, in order to find the reason why the bonded magnet described above could not achieve the intended magnet density or mechanical strength, the present inventors analyzed the compound yet to be compacted. As a result, the present inventors discovered that in a compound including as much resin as its counterpart of Patent Document No. 3, the magnet powder was coated with the resin almost uniformly but coagulation of magnet powder particles with relatively small particle sizes was observed a lot. In a compound with a resin content of 1.0 mass % or less, such coagulation of magnet powder particles was also observed as much as in the compound described above, and the surface of the magnet powder particles was not uniformly coated with the resin. And even if such a compound was compressed and compacted, the intended mechanical strength or electrical resistance could not be achieved.

It is therefore an object of the present invention to provide a method for producing a bonded rare-earth magnet which has not only as high magnet density and magnetic properties as a binderless magnet but also as high electrical resistance as a conventional bonded magnet and a practical mechanical strength.

Solution to Problem

A method for producing a bonded rare-earth magnet according to the present invention includes the steps of: providing a rapidly solidified rare-earth magnet alloy powder; providing a solution in which a resin that is in solid phase at an ordinary temperature is dissolved in an organic solvent; mulling the rapidly solidified rare-earth magnet alloy powder and the solution together and vaporizing the organic solvent, thereby making a bonded rare-earth magnet compound in which magnet powder particles that form the rapidly solidified rare-earth magnet alloy powder are coated with the resin; making a compressed compact by compressing the bonded rare-earth magnet compound under a pressure of 1000 MPa to 2500 MPa; and thermally treating the compressed compact. If the rapidly solidified rare-earth magnet alloy powder to be mulled is 100 mass %, the solution includes 0.4 mass % to 1.0 mass % of the resin and 1.2 mass % to 20 mass % of the organic solvent.

In one embodiment, in the bonded rare-earth magnet compound, the resin coats the magnet powder particles at a coverage of 90% or more.

In one embodiment, the resin that coats the magnet powder particles has a thickness of 0.1 μm to 1 μm.

In one embodiment, the step of making a compressed compact includes compressing the bonded rare-earth magnet compound so that the density of the compressed compact falls within the range of 83% to 86% of the true density of the rapidly solidified rare-earth magnet alloy powder.

In one embodiment, the method includes the steps of: subjecting the compressed compact to a barrel process after the step of thermally treating; dipping the compressed compact that has been subjected to the barrel process in a resin solution that has been diluted with an organic solvent and that includes 2 to 13 wt % of thermosetting resin component; and removing the compressed compact from the resin solution and drying it.

Advantageous Effects of Invention

According to an embodiment of the present invention, a bonded rare-earth magnet, which has a high magnet density that has never been achieved by any conventional bonded rare-earth magnet, can be obtained. The bonded rare-earth magnet obtained by the present invention has excellent magnetic properties compatible with that high magnet density.

According to an embodiment of the present invention, a bonded magnet is made by compressing and compacting magnet powder particles, which are very thinly and uniformly coated with a resin, at an ultrahigh pressure. As a result, a bonded magnet that has both high electrical resistance and practical mechanical strength alike can be obtained. In addition, the manufacturing process of the present invention uses a solid resin (i.e. resin that is in solid phase at an ordinary temperature), which is easy to handle, and therefore, is suitable for mass production.

BRIEF DESCRIPTION OF DRAWINGS

FIG. 2 (a) through (d) are scanning electron microscope (SEM) photographs showing how the surface of the magnet powder changes from an early stage through the end of a mulling process step in the manufacturing process of the present invention.

FIGS. 5 (a) and (b) are SEM photographs showing the compounds of Samples Nos. 10 and 13 representing a comparative example and a specific example of the present invention, respectively.

FIGS. 6 (a) and (b) are SEM photographs (of Samples Nos. 1 and 13) representing a cross section of the resin that covered the surface of the magnet powder.

FIGS. 7 (a) and (b) are SEM photographs showing the respective surfaces of the sample magnets Nos. 1 and 11 that were subjected to the barrel process.

DESCRIPTION OF EMBODIMENTS

The present inventors carried out an exhaustive research to find how to make a compound for a bonded magnet in which magnet powder particles are uniformly coated with resin and yet do not coagulate together. As a result, the present inventors found a method for coating the surface of magnet powder particles thinly and uniformly by reducing the amount of resin being mulled with the magnet powder compared to the conventional process, thus perfecting our invention. According to the present invention, by compressing and compacting this novel bonded magnet compound (which will be simply referred to herein as a "compound") at an ultrahigh pressure, even at an amount of resin of 1 mass % or less, at which they believed it impossible to achieve practically high mechanical strength in the related art, a bonded magnet, of which the magnet density was 83% to 86% of the true density or the magnet powder and was as high as that of a binderless magnet and which had a practical mechanical strength of 30 MPa or more, could be obtained.

Figure 1:
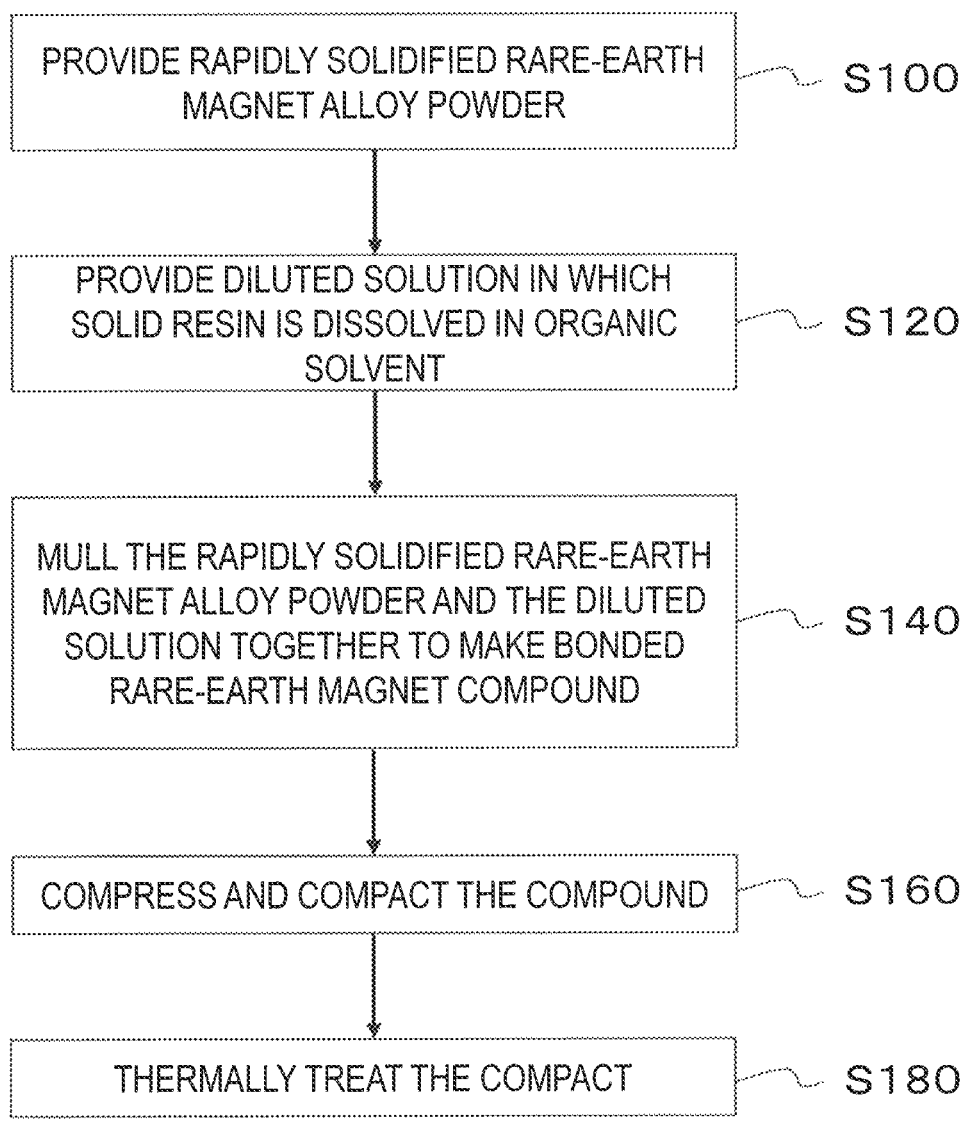
FIG. 1 A flowchart showing an exemplary method for producing a bonded magnet according to the present invention.

Hereinafter, it will be described with reference to FIG. 1 how to make a bonded rare-earth magnet according to the present invention.

A method for producing a bonded rare-earth magnet according to the present invention includes the steps of providing a rapidly solidified rare-earth magnet alloy powder (S100) and providing a solution in which a solid resin is dissolved in a organic solvent (S120). If the rapidly solidified rare-earth magnet alloy powder to be mulled is 100 mass %, the solution includes 0.4 mass % to 1.0 mass % of the resin and 1.2 mass % to 20 mass % of the organic solvent. The present inventors discovered via experiments that if a compound was made by using this solution and mixing this solution with the magnet powder so that the resin accounted for 0.4 mass % to 1.0 mass % of the overall mass of the magnet powder, then a compound in which the magnet powder particles did not coagulate but had their surface coated with resin thinly and uniformly could be obtained.

Next, the rapidly solidified rare-earth magnet alloy powder and the solution are mulled together (S140). This mulling process step is carried out with the amount of the resin adjusted so that the resin accounts for 0.4 mass % to 1.0 mass % of the rapidly solidified rare-earth magnet alloy powder as described above. By vaporizing the organic solvent during this mulling process step, a bonded rare-earth magnet compound in which the magnet powder particles that form the rapidly solidified rare-earth magnet alloy powder are coated with the resin can be obtained. In a preferred embodiment, the resin in the compound coats the magnet powder particles at a coverage of 90% or more and has a thickness of 0.1 μm to 1 μm.

Subsequently, this bonded rare-earth magnet compound is compressed under a pressure of 1000 MPa to 2500 MPa, thereby obtaining a compressed compact (S160). After that, the compressed compact is thermally treated (S180). In this process step of making a compressed compact, the bonded rare-earth magnet compound is suitably compressed so that the density of the compressed compact will fall within the range of 83% to 86% of the true density of the rapidly solidified rare-earth magnet alloy powder.

As described above, the resin included in the compound for use in the present invention accounts for 0.4 mass % to 1.0 mass % of the mass of the overall magnet powder. The reason is that if the resin accounted for less than 0.4 mass %, practical mechanical strength could not be obtained. However, if the resin accounted for more than 1.0 mass %, then the intended magnet density could not be obtained. It is recommended that the resin account for 0.5 mass % to 0.9 mass %.

The resin is dissolved in an organic solvent which accounts for 1.2 mass % to 20 mass % with respect to the overall magnet powder. If the resin is dissolved in such a volume or organic solvent, a thinner solution than a one used in a conventional manufacturing process (e.g., the manufacturing process disclosed in Patent Document No. 3) is obtained. However, by mixing such a solution with the magnet powder, the resin can get evenly distributed over the surface of the magnet powder, which can eventually be uniformly coated with a thinner resin than the conventional one. If the organic solvent accounted for less than 1.2 mass % of the magnet powder, the organic solvent could vaporize before the resin gets distributed over the entire surface of the magnet powder in the process step of mulling the magnet powder and the solution together, and the magnet powder could not be coated uniformly with the resin. The present inventors concluded via experiments that a critical point at which the magnet powder may or may not be uniformly coated with the resin should be present between 0.9 mass % and 1.2 mass % accounted by the organic solvent for the overall magnet powder. Specifically, the present inventors discovered that when the organic solvent accounted for 0.9 mass %, the coverage was 50% or less but that when the organic solvent accounted for 1.2 mass %, the magnet powder could be coated uniformly with the resin at a coverage of 90% or more. However, if the organic solvent accounted for more than 20 mass % of the overall magnet powder, then it would take a lot of time for the organic solvent to vaporize, which is not beneficial in terms of productivity.

There is no particular limit to the kind of resin to use as long as the resin is in solid phase at an ordinary temperature. Examples of preferred solid resins include bisphenol A epoxy resin, cresol novolac epoxy resin, and phenol novolac epoxy resin. Meanwhile, examples of preferred curing agents include amines, polyamides, imidazoles, acid anhydrides and latent curing agents.

The organic solvent to use is suitably a volatile organic solvent which goes gaseous at an ordinary temperature in terms of work efficiency. Examples of preferred organic solvents include acetone, methyl ethyl ketone, methyl isobutyl ketone, benzene, toluene and xylene. In view of safety and handling considerations, ketones such as methyl ethyl ketone are particularly preferred. To avoid doing damage on the die during the compression and compaction process at an ultrahigh pressure, a lubricant such as calcium stearate is suitably added to, and mixed with, the compound.

The magnet powder and the solution in which the solid resin is dissolved in the organic solvent are mixed and then mulled together until the organic solvent vaporizes, thereby making a compound.

Portions (a) through (d) of FIG. 2 are scanning electron microscope (SEM) photographs showing how the surface of the magnet powder changes from an early stage through the end of the mulling process step in the manufacturing process of the present invention. Specifically, portion (a) of FIG. 2 shows a state right after the mulling process step has been started, portions (b) and (c) of FIG. 2 show the progress of the mulling process step, and portion (d) of FIG. 2 shows that the mulling process step has ended.

While the mulling process step is going on, actually some organic solvent that has not vaporized yet is left. However, while preparing for the SEM observation after having stopped the mulling process step halfway through, the organic solvent further vaporizes. That is why before the SEM observation is stated, the organic solvent has vaporized completely and only solid resin is left on the surface of the magnet powder particles as can be seen from portions (a) through (c) of FIG. 2.

If no SEM observation is carried out, more and more magnet powder particles get coated with the resin because some organic solvent is left while the mulling process step is going on. But by the time when the mulling process step ends, the organic solvent will have vaporized completely. That is why in the compound obtained by getting the mulling process step done, substantially no organic solvent will be left, and the surface of the respective magnet powder particles that are included in the compound will be coated with the solid resin.

As can be seen from these portions (a) through (d) of FIG. 2, as the mulling process step progresses, more and more magnet powder particles get coated with the resin. When the mulling process step ends, the coverage is 90% or more. In this case, the "coverage" is obtained by observing the surface of magnet powder particles through an SEM and by analyzing the backscattered electron image in an arbitrary field of view. With the backscattered electron image obtained by SEM observation, by regulating the acceleration voltage of an electron beam so that the electron beam is not transmitted through the thin resin to make the resin and the magnetic powder clearly distinguishable from each other, heavy and light elements can be distinguished from each other by the difference in contrast. That is to say, on the surface of magnet powder particles, an area where there is no resin and an area coated with the resin can be easily distinguished from each other. The coverage is defined to be the ratio of the area of the resin-coated portion to the overall area of the magnet powder particles in the entire field of view that has been obtained by analyzing the backscattered electron image.

In the example shown in FIG. 2, the organic solvent accounts for 1.8 mass % of the magnet powder. That is why before the organic solvent vaporizes completely, a sufficiently large number of magnet powder particles can get coated with the resin uniformly. However, if there were too little organic solvent, then the organic solvent would vaporize entirely and the mulling process step would end in a state where the number of magnet powder particles coated with the resin is insufficient yet (i.e., in a stage similar to the ones shown in portions (a) and (b) of FIG. 2).

In a preferred embodiment of the present invention, a compound in which the magnet powder particles are coated with the resin at a coverage of 90% or more is obtained as described above. The coated portions have a uniform resin thickness of 1 μm or less as a whole. The resin that covers the magnet powder particles typically has a thickness of 0.1 μm to 0.5 μm.

If the coverage were less than 90%, magnet powder particles that are not coated with the resin could contact and get conductive with each other, thus increasing the chances of failing to get a high electrical resistance value. The upper limit on the coverage is 1.00%.

The compound that has been obtained as described above is compressed and compacted at an ultrahigh pressure of 1000 MPa to 2500 MPa. If the compacting pressure were less than 1000 MPa, neither practical mechanical strength nor high magnet density could be achieved. However, if the compacting pressure exceeded 2500 MPa, then too heavy a load would be placed on the die, which is not suitable for mass production. The compacting pressure more suitably falls within the range of 1400 MPa to 2000 MPa.

The compressed compact may be obtained in the following manner, for example.

Figure 3:
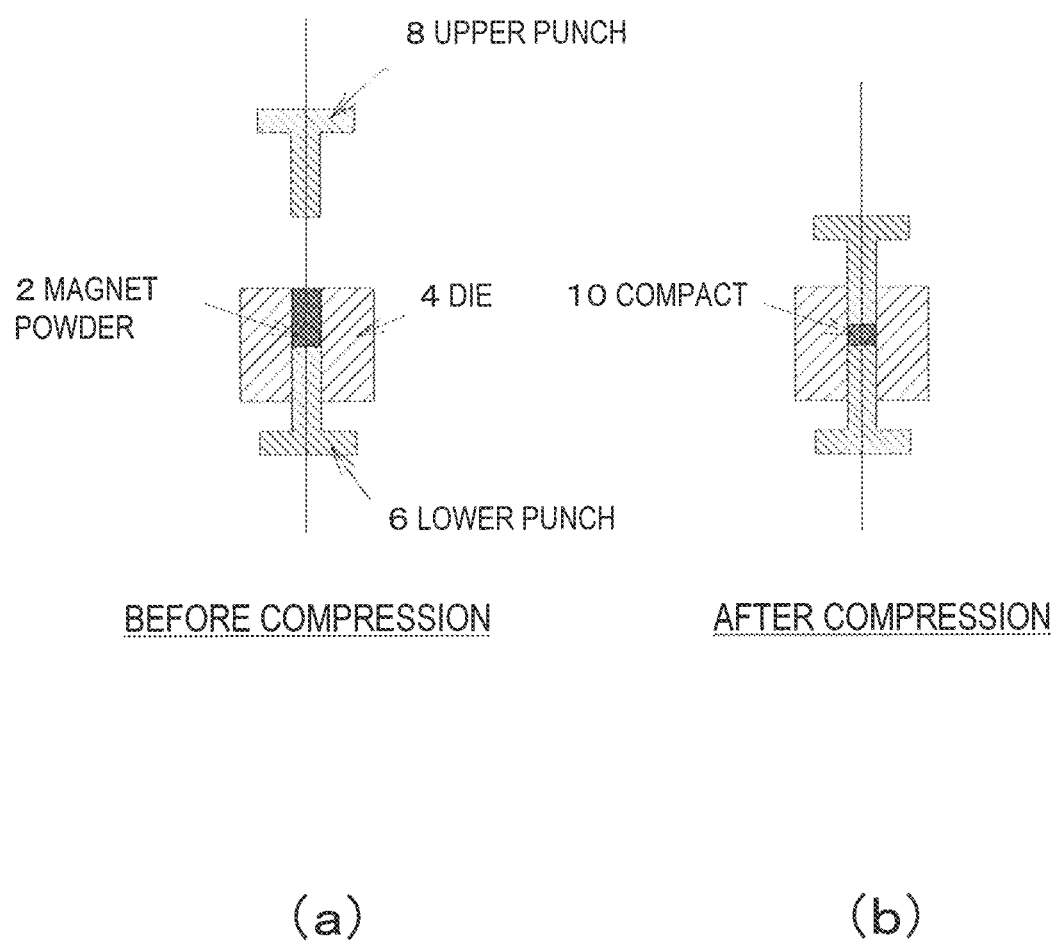
FIGS. 3 (a) and (b) illustrate an exemplary configuration for a compression press machine which can be used effectively in an embodiment of a bonded rare-earth magnet manufacturing process according to the present invention.

FIG. 3 is a cross-sectional view illustrating a general configuration for an ultrahigh pressure powder press machine that can be used effectively to carry out the present invention. The machine shown in FIG. 3 can make a uniaxial press on a magnet powder material 2, which has been loaded into a cavity, under high pressures. The machine includes a die 4, of which the inner surface defines the side surface of the cavity, a power punch 6 with a lower pressing surface that defines the bottom of the cavity, and an upper punch 8 with an upper pressing surface that faces the lower pressing surface. The die 4, the lower punch 6 and/or the upper punch 8 are driven up and down by a driver (not shown).

In the state shown in FIG. 3(a), the top of the cavity is opened and the magnet powder 2 is loaded into the cavity. Thereafter, by either moving down the upper punch 8 or moving the die 4 and the lower punch 6 up, the magnet powder 2 in the cavity is compressed and compacted as shown in FIG. 3(b).

The die 4 and the upper and lower punches 8 and 6 may be made of cemented carbide or a powder high speed steel but may also be made of a high strength material such as SKS, SKD or SKH.

These high strength materials are hard but brittle. That is why if the press direction deviated albeit slightly, these materials would be broken easily. That is why to get the ultrahigh pressure compaction done as in the present invention, the misalignment between the center axes and the tilt precision of the die 4 and the upper and lower punches 8 and 6 need to be 0.01 mm or less. If the axial misalignment or axial tilt were significant, then the upper and lower punches 8 and 6 would buckle and be broken under the ultrahigh pressure. The smaller the size of the compressed compact to make, the smaller the diameter of the shaft of the upper and lower punches 8 and 6 and the more serious such a problem gets.

Figure 4:
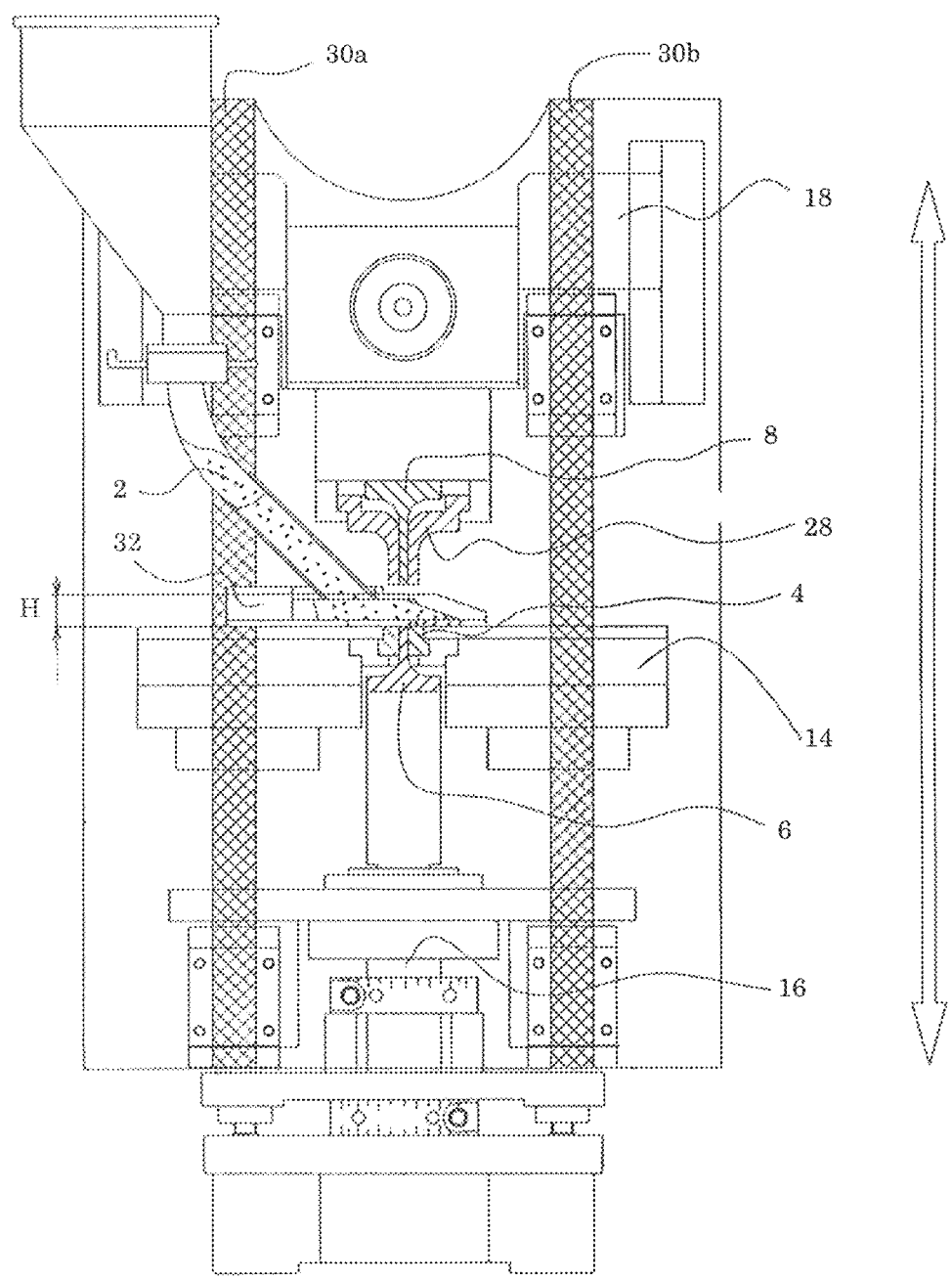
FIG. 4 Illustrates an exemplary configuration for an ultrahigh pressure powder press ma chine that can be used effectively in an embodiment of the present invention.

To prevent the upper and lower punches 8 and 6 from being broken and to carry out the ultrahigh pressure press process, which would be difficult to perform by a conventional technique, with good stability, the ultrahigh pressure powder press machine for use in this embodiment suitably has a structure such as the one shown in FIG. 4. Hereinafter, the configuration of the high-pressure powder press machine shown in FIG. 4 will be described.

In the machine shown in FIG. 4, a fixing die plate 14 fixes the die 4 thereon, and lower punch 6 is inserted into the through hole of the die 4. The lower punch 6 is moved up and down by a lower ram 16, while the upper punch 8 is reinforced with an upper punch outer surface reinforcing guide 28 and is moved up and down by and upper ram 18. The upper ram 18 is moved down and the bottom of the upper punch outer surface reinforcing guide 28 soon contacts with the upper surface of the die 4, when the upper punch outer surface reinforcing guide 28 stops lowering. However, the upper punch 8 continues to move further downward to enter the through hole of the die 4 eventually. By providing the upper punch outer surface reinforcing guide 28, the upper punch 8 can have its durability increased under the ultrahigh pressure.

This press machine further includes a pair of linear guide rails 30a and 30b that are arranged symmetrically to each other with respect to the center axis of the fixing die plate 14. The upper and lower rams 18 and 16 communicate with each other through the linear guide rails 30a and 30b and slide up and down on the rails. The press machine shown in FIG. 4 uses a feeder that moves straight and reciprocates back and forth very quickly, and therefore, the feeder cup 32 thereof can have a reduced thickness H. That is why when the upper punch 8 is retracted over the die 4, the gap between the upper punch 8 and the die 4 can be narrowed. The narrower this gap, the shorter the distance the upper punch 8 has to go up and down. As a result, axial misalignment and tilting, which will often be caused by vertical motions, can be reduced.

By thermally treating the compact that has been compressed in this manner, the resin can be cured and a bonded magnet can be obtained. The heat treatment condition may be set according to the condition for curing the resin to use, but the heat treatment is ordinarily conducted at 150° C. to 200° C. for approximately two hours within either an inert gas ambient or a low pressure ambient, which hardly affects the magnetic properties.

The rapidly solidified rare-earth magnet alloy powder that can be used in the present invention is not particularly limited.

For example, the rapidly solidified rare-earth magnet alloy powder can be made by pulverizing a rapidly solidified alloy ribbon that has been obtained by quenching a molten alloy with a predetermined composition by a roller melt-quenching process such as the MS or SC method. As the rapidly solidified rare-earth magnet alloy powder, the Ti including nanocomposite magnet powder disclosed in PCT International Application Publications Nos. 2006/064794 and 2006/101117 or the rapidly solidified rare-earth magnet alloy powder disclosed in U.S. Pat. No. 4,802,931 may be used.

In these alloy powders, the respective magnet powder particles have a flat shape. For example, the shape of the magnet powder particles may be defined by an aspect ratio (that is the ratio of the minor axis size to the major axis size) of 0.3 or less. According to the present invention, the magnet power particles hardly coagulate in the compound. That is why when the rapidly solidified rare-earth magnet alloy powder is compressed and compacted, magnet powder particles with small particle sizes will rarely, if ever, be interposed between magnet powder particles with large particle sizes due to coagulation of the compound. Consequently, if the rapidly solidified rare-earth magnet alloy powder with such a flat shape is used, the magnet powder particles will be stacked one upon the other relatively orderly as a result of the compression and compaction process, and voids or resin pools are unlikely to be produced between the magnet powder particles, thus realizing high fill density easily.

If an alloy powder with such a flat shape is used as the rapidly solidified rare-earth magnet alloy powder, then the gap between the magnet powder particles in which the longer sides of the magnet powder particles (i.e., the sides of the magnet powder particles as measured in the major axis direction on their cross section) face each other as measured on a cross section parallel to the pressing direction is 2 µm or less, and typically falls within the range of 0.1 to 1.0 µm.

The bonded magnet of the present invention has a magnet density that accounts for 83% to 86% of its true density. The magnet of the present invention is a bonded magnet but has as high a magnet density as a binderless magnet's. Specifically, the bonded magnet of the present invention has a density of approximately 6.4 to 6.6 g/cm³, which is higher than that of an ordinary bonded magnet e.g., in the range of approximately 6.0 to 6.2 g/cm³) or those of the bonded magnets of Patent Documents Nos. 2 and 3.

Also, the bonded magnet of the present invention has approximately as high electrical resistance as a normal compressed bonded magnet. When measured by the four-terminal method, for example, the electrical resistance of a bonded magnet representing a specific example of the present invention becomes 1600 µΩ·m or more. In a preferred embodiment of the present invention, the bonded magnet has a practical mechanical strength of 30 MPa or more (in the case of a ring magnet, its radial crushing strength is estimated by the method defined by JIS Z2507).

Also, in the bonded magnet of the present invention, the resin that covers the magnet-powder particles in the compound typically has so small a thickness as 0.1 µm to 0.5 µm that the resin exposed on the surface of the thermally treated compact (i.e., bonded magnet) becomes very thin, too. Such tin resin can be easily removed by barrel process. And since the bonded magnet that has had that thin resin removed by barrel process has a surface with very good wettability, a simplified rustproofing treatment, in which a rustproof film is obtained by dipping the magnet in a resin solution with a very high concentration and drying it, can be carried out. For example, even if the bonded magnet is subjected to a weathering test using 80° C. 90% RH×50 hours by performing a very simple treatment in which the magnet is dipped in a resin solution (with a resin concentration of 2 to 13 wt %) where a thermosetting resin is diluted with an organic solvent and then dried, the magnet does not get rusty. In addition, since a thin rustproof film is formed over the entire bonded magnet, excellent size precision is achieved, too. Meanwhile, in a conventional bonded magnet, the resin exposed on its surface is as thick as 1 µm or more, and therefore, cannot be removed completely by barrel process. And even if such a bonded magnet were subjected to the simplified rustproofing treatment as described above, the remaining resin portions would repel the rustproofing resin solution, and therefore, the weather resistance would be less than expected. In addition, since the rustproof film does not have a uniform thickness, the size precision decreases, too.

As long as the resin can be removed from the surface without causing the bonded magnet to crack or chip, any kind of barrel process may be carried out. For example, the barrel process may be carried out for about two to five minutes by using a steel medium such as SUS or a plastic medium in a vibrating or rotating barrel. In that case, the frequency and the number of revolutions are determined carefully so as not to cause the bonded magnet to crack or chip, even though it depends on the size of the barrel machine or the medium to use.

As long as it is a thermosetting resin, the resin to use to prepare the resin solution is not particularly limited. Examples of preferred resins include bisphenol A epoxy resin bisphenol F epoxy resin, cresol novolac epoxy resin, phenol novolac epoxy resin, denatured epoxy resin, resole phenol resin, novolac phenol resin, and denatured phenol resin. Any of these resins is diluted with an organic solvent so that the resin has a concentration of 2 to 13 mass %. Examples or organic solvents to use include methanol, ethanol and IPA.

The bonded magnet is dipped in the resin solution suitably for two to five minutes. Even though it depends on the condition for curing the resin to use, the drying process after dipping is ordinarily carried out at a temperature of 100° C. to 200° C. for 10 to 60 minutes.

On the surface of the dried bonded magnet, formed is a rustproof film, of which the thickness is more than 0 µm and equal to or smaller than 10 µm. The thickness of the rustproof film can be measured by observing its cross section through an SEM. The lower limit of the thickness of the rustproof film is more than 0 µm. That is why the rustproof film is partially too thin to have its thickness measured by observation through a microscope. However, since the surface of the compressed compact that has been subjected to the barrel process has very good wettability, even that thin rustproof film can also be formed over the entire surface of the bonded magnet. For that reason, even when subjected to a weathering test at 80° C.×95% RH, the bonded magnet that has gone through the process step described above does not get rusty for 50 hours or more, and therefore, has practical weather resistance.

EXAMPLES

Example 1

As a magnet powder, a Ti including nanocomposite magnet powder was prepared by pulverizing and thermally treating a rapidly solidified alloy ribbon that had been obtained by melt spinning process to have the composition $Nd_{8.6}Pr_{0.1}Fe_{84.4}B_{6.0}Ti_{0.9}$ (in atomic percentages). The magnet powder was then classified using a sieve. As a result, its 50 mass % particle size fell within the range of 75 μm to 105 μm.

Supposing the mass of the magnet powder to mull was 100 mass %, a resin (such as bisphenol A epoxy resin) and a curing agent (which accounted for 5 mass % with respect to the epoxy resin), of which the mass percentage was defined by the "amount of resin" in Table 1, were provided and then dissolved in methyl ethyl ketone (MEK) to obtain a solution. The percentage of the methyl ethyl ketone was defined by the mass percentage which is represented as "MEK percentage" in Table 1 with respect to the mass of the magnet powder to mull.

Subsequently, this solution and the magnet powder were mixed together and then mulled together until the methyl ethyl ketone in the solution vaporized completely. Thereafter, calcium stearate which accounted for 0.3 mass % with respect to the mass of the magnet powder was mixed with the magnet powder to obtain a compound. In Sample No. 16, only the calcium stearate which accounted for 0.3 mass % with respect to the mass of the magnet powder was mixed with the magnet powder without using any solution.

coated portion was obtained by filling the compound with the resin, polishing the resin-filled compound to expose a cross section of the compound, and then observing the cross section of the compound through an SEM. FIGS. 6(a) and 6(b) are micrograms (of Samples Nos. 1 and 13) representing a cross section of the resin that covered the surface of the magnet powder. In each of these photographs, the upper part represents a protective film for microscopy, the middle part represents the resin, and the lower part represents the magnet powder.

In the compounds (Samples Nos. 6 to 9 and 11 to 14 representing specific examples of the present invention) in which the resin accounted for 0.4 to 1.0 mass % with respect to the magnet powder and in which methyl ethyl ketone accounted for 1.2 to 1.8 mass % with respect to the magnet powder, the magnet powder did not coagulate. Also, in each of those compounds, respective magnet powder particles were substantially uniformly coated with the resin and the coverage was 90% or more.

As can be seen from the results (of Samples Nos. 1 to 4 representing comparative examples) shown in Table 1, if the resin accounted or more than 1.0 mass % with respect to the magnet powder to mull, the thickness of the resin that coated the magnet powder particles in the compound exceeded 1 μm. Also, no matter how much methyl ethyl ketone was

TABLE 1

| Sample No. | Percentage of resin [mass %] | Percentage of MEK to magnet powder [mass %] | Compacting pressure [MPa] | Compound's resin thickness [μm] | Coverage | Coagulation | |
|---|---|---|---|---|---|---|---|
| 1 | 2.0 | 1.8% | 980 | 1 μm < and ≤ 2 μm | ≥90% | Much | Cmp. Ex. |
| 2 | | 1.8% | 1960 | 1 μm < and ≤ 2 μm | ≥90% | Much | Cmp. Ex. |
| 3 | | 0.9% | 1960 | 1 μm < and ≤ 2 μm | 50% | Much | Cmp. Ex. |
| 4 | 1.5 | 1.8% | 1960 | 1 μm < and ≤ 2 μm | ≥90% | Much | Cmp. Ex. |
| 5 | 1.0 | 0.9% | 1960 | 0.4 μm < and ≤ 1 μm | 50% | Much | Cmp. Ex. |
| 6 | | 1.8% | 1960 | 0.2 μm < and ≤ 0.5 μm | ≥90% | NO | Example |
| 7 | | 1.2% | 1470 | 0.2 μm < and ≤ 0.5 μm | ≥90% | NO | Example |
| 8 | | 1.2% | 1960 | 0.2 μm < and ≤ 0.5 μm | ≥90% | NO | Example |
| 9 | 0.8 | 1.2% | 1960 | 0.2 μm < and ≤ 0.4 μm | ≥90% | NO | Example |
| 10 | 0.5 | 0.9% | 1960 | 0.3 μm < and ≤ 0.7 μm | 42% | Much | Cmp. Ex. |
| 11 | | 1.8% | 1960 | 0.1 μm < and ≤ 0.3 μm | ≥90% | NO | Example |
| 12 | | 1.2% | 1470 | 0.1 μm < and ≤ 0.3 μm | ≥90% | NO | Example |
| 13 | | 1.2% | 1960 | 0.1 μm < and ≤ 0.3 μm | ≥90% | NO | Example |
| 14 | 0.4 | 1.2% | 1960 | 0.1 μm < and ≤ 0.3 μm | ≥90% | NO | Example |
| 15 | 0.3 | 1.8% | 1960 | 0.05 μm < and ≤ 0.2 μm | ≥90% | NO | Cmp. Ex. |
| 16 | 0.0 | — | 1960 | — | — | — | Cmp. Ex. |

The compound thus obtained was observed through an SEM to estimate the coverage with the resin and the thickness of the resin coated portion and determine whether the compound coagulated or not. The results are summarized in Table 1. The coverage was obtained by carrying out an image analysis on the backscattered electron image that had been observed through an SEM. The thickness of the resin included with respect to the magnet powder, relatively small magnet powder particles were often observed to coagulate.

Even if the mass percentage accounted for by the resin with respect to the magnet powder to mull fell within the range of 0.4 to 1.0 mass %, respective magnet powder particles were not coated with the resin in some portions of compounds (Samples Nos. 5 and 10 representing comparative examples) in which methyl ethyl ketone accounted for less than 1.2 mass % with respect to the magnet powder. And the coverage was 42 to 50% in those compounds.

The thickness of the resin coated portion was approximately 0.1 to 0.5 μm in the compounds of Samples Nos. 6 to 9 and 11 to 14 (representing specific examples of the present invention) but was about 0.05 to 0.2 μm in the compound (of Sample No. 15 representing a comparative example) in which the resin accounted for 0.3 mass % with respect to the magnet powder.

FIGS. 5(a) and 5(b) are SEM photographs showing the compounds of Samples Nos. 10 and 13 representing a comparative example and a specific example of the present invention, respectively. As can be seen from FIG. 5(a), a lot of relatively small magnet powder particles were observed to coagulate together in the compound representing the comparative example. In the compound representing this specific example of the present invention, on the other hand, almost no coagulation was seen unlike the comparative example as can be seen from FIG. 5(b). It can also be seen that even though the respective magnet powder particles were entirely coated with the resin substantially uniformly in the compound representing the specific example of the present invention, respective magnet powder particles were not coated in some portions in the compound representing the comparative example. That is to say, in the comparative example, the coverage was less than 90%.

The compounds thus obtained (as Samples Nos. 1 through 15) were compressed an compacted under the compacting pressures shown in Table 1, thereby making compacts. These compacts were then thermally treated at a temperature of 180° C. for two hours in a low pressure ambient to obtain ring-like bonded magnets with an inside diameter of 7.7 mm×an outside diameter of 12.8 mm×a height of 4.8 mm.

The magnet powder of Sample No. 16 was compressed and compacted under the compacting pressure shown in Table 1 to obtain a compact, which was then thermally treated at 450° C., thereby obtaining a binderless magnet. The magnet densities, compact strengths (radial crushing strengths), and electrical resistance of the bonded magnets and binderless magnets thus obtained were estimated. The results are shown in the following Table 2. The density was calculated based on the volume and mass of each compact. As for the compact strength, a weight was applied radially by a compression tester according to the method defined by JIS Z2507, and the weight that caused breakdown was measured. The electrical resistance was measured by the four-terminal method by making a prism bonded magnet and a binderless magnet with dimensions of 17 mm×5 mm×5 mm separately under the same condition based on the respective samples.

As can be seen from Table 2, each of the bonded magnets representing specific examples of the present invention had a magnet density of 6.4 g/cm³ or more, a compact strength of 30 MPa or more, and an electrical resistance of 1600 μΩ·cm or more. However, none of the bonded magnets representing comparative examples and binderless magnet of Sample No. 16 could satisfy any of these requirements.

TABLE 2

| Sample No. | Magnet density [g/m³] | Compact strength [MPa] | Electrical Resistance [μΩ · cm] | |
|---|---|---|---|---|
| 1 | 6.0 | 65 | 2800 | Cmp. Ex. |
| 2 | 6.2 | 79 | 2800 | Cmp. Ex. |

TABLE 2-continued

| Sample No. | Magnet density [g/m³] | Compact strength [MPa] | Electrical Resistance [μΩ · cm] | |
|---|---|---|---|---|
| 3 | 6.2 | 38 | 700 | Cmp. Ex. |
| 4 | 6.3 | 65 | 2500 | Cmp. Ex. |
| 5 | 6.4 | 29 | 700 | Cmp. Ex. |
| 6 | 6.4 | 59 | 2200 | Example |
| 7 | 6.4 | 48 | 2200 | Example |
| 8 | 6.4 | 63 | 2200 | Example |
| 9 | 6.4 | 53 | 1900 | Example |
| 10 | 6.5 | 29 | 600 | Cmp. Ex. |
| 11 | 6.5 | 35 | 2600 | Example |
| 12 | 6.5 | 32 | 2300 | Example |
| 13 | 6.5 | 36 | 2000 | Example |
| 14 | 6.5 | 31 | 1700 | Example |
| 15 | 6.5 | 25 | 1500 | Cmp. Ex. |
| 16 | 6.5 | 8 | 200 | Cmp. Ex. |

Example 2

A single-phase melt-quenched magnet powder produced by Magnequench international, Inc. was provided as the magnet powder and a compound and a compact were made as Sample No. 17 under the same condition as in Sample No. 13 of EXAMPLE 1. This single-phase melt-quenched magnet powder had the composition $Nd_{12}Fe_{77}B_5Co_6$ (in atomic percentages) and had a mean particle size (i.e., a 50 mass % particle size obtained by classification with a sieve) of 90 μm. The bonded magnet thus obtained had a density of 6.5 g/cm³, a radial crushing strength of 36 MPa, an electrical resistance of 2000 μΩ·cm, all of which were equal to or greater than their required values.

Example 3

Compounds and compacts were made under the same condition as Samples Nos. 1, 7, 8, 11, 12, 13 and 17 of EXAMPLES 1 and 2. Their conditions are summarized in the following Table 3. Magnet powders A and B were the same as the one used in EXAMPLE 1 and the one used in EXAMPLE 2, respectively

TABLE 3

| Sample No. | Magnet powder | Percentage of resin [mass %] | Percentage of MEK to magnet powder [mass %] | Compacting pressure [MPa] | |
|---|---|---|---|---|---|
| 1 | A | 2.0 | 1.8% | 980 | Cmp. Ex. |
| 7 | A | 1.0 | 1.2% | 1470 | Example |
| 8 | A | 1.0 | 1.2% | 1960 | Example |
| 11 | A | 0.5 | 1.8% | 1960 | Example |
| 12 | A | 0.5 | 1.2% | 1470 | Example |
| 13 | A | 0.5 | 1.2% | 1960 | Example |
| 17 | B | 0.5 | 1.2% | 1960 | Example |

These compacts were subjected to a barrel process for three minutes using an SUS medium in a vibrating barrel (CCL-50SB manufactured by Tipton Corporation). The respective surfaces of the sample magnets Nos. 1 and 11 that had been subjected to the barrel process were observed through a scanning, electron microscope (SEM). The photographs thus obtained are shown in FIGS. 7(a) and 7(b). The present inventors discovered that on the surface of Sample No. 1 in which the resin accounted for 2.0 mass % with respect to the magnet powder, some resin was left but that the resin had been removed completely from the surface of Sample No. 11 in which the resin accounted for 0.5 mass % with respect to the magnet powder.

Each of these compacts that had been subjected to the barrel process was dipped for three minutes in the resin solution shown in the following Table 4 (in which Resin I was obtained by diluting a resole phenol resin with IPA and Resin II was obtained by diluting special denatured epoxy resin with ethanol and then had their concentrations adjusted to the ones shown in Table 4), pulled up, and then dried at 150° C. for 30 minutes in the air. On the surface of the dried compact representing a specific example of the present invention, a resin film (i.e., rustproof film) had been formed to a thickness of 0.5 to 3 μm. On the surface of the dried compact representing a comparative example, on the other hand, a resin film (i.e., rustproof film) had been formed to a thickness of 10 to 40 μm. The thicknesses of these resin films were measured by observing their cross section through an SEM. These compacts had their size precision and weather resistance evaluated. Their size precision was evaluated by regarding a compact, of which the resin film thickness varied by ±5 μm or less, as a GO and a compact, of which the resin film thickness varied by more than ±5 μm, as a NO-GO. On the other hand, the weather resistance was evaluated by leaving the compacts in a 80° C.×95% RH temperature and humidity testing chamber for 50 hours and by regarding a compact that did not get rusty as a GO and a compact that got rusty as a NO-GO. The results are shown in the following Table 4, in which ○ indicates that the size precision and weather resistance were both okay, x indicates that only the size precision was no good, R indicates that only the weather resistance was no good, and R x indicates that the size precision and the weather resistance were both no good.

The present inventors discovered that the size precision and weather resistance of a bonded magnet representing a specific example of the present invention were both okay when the resin concentration fell within the range of 2 to 13 mass %.

TABLE 4

| Sample No. | Resin | \multicolumn{11}{c}{Resin concentration [mass %]} | |
|---|---|---|---|---|---|---|---|---|---|---|---|---|---|
| | | 1.5 | 2.5 | 3.7 | 5.0 | 6.2 | 7.4 | 8.7 | 9.9 | 11.2 | 12.5 | 13.6 | |
| 1 | I | R | R | RX | RX | RX | — | — | — | — | — | — | Cmp. Ex. |
| 7 | | R | ○ | ○ | ○ | ○ | ○ | ○ | ○ | ○ | ○ | X | Example |
| 8 | | R | ○ | ○ | ○ | ○ | ○ | ○ | ○ | ○ | ○ | X | Example |
| 11 | | R | ○ | ○ | ○ | ○ | ○ | ○ | ○ | ○ | ○ | X | Example |
| 12 | | R | ○ | ○ | ○ | ○ | ○ | ○ | ○ | ○ | ○ | X | Example |
| 17 | | R | ○ | ○ | ○ | ○ | ○ | ○ | ○ | ○ | ○ | X | Example |
| 13 | II | R | ○ | ○ | ○ | ○ | ○ | ○ | ○ | ○ | ○ | X | Example |

INDUSTRIAL APPLICABILITY

A magnet according to the present invention has high magnet density, excellent magnetic properties, practical strength, and high electrical resistance, and therefore, can be used effectively in various fields in which conventional bonded magnets have been used.

REFERENCE SIGNS LIST 2 magnet powder (rapidly solidified rare-earth magnet alloy powder)
4 die
6 lower punch
8 upper punch
10 compact (compressed compact)
14 fixing die plate
16 lower ram
18 upper ram
28 upper punch outer surface reinforcing guide
30a linear guide rail
30b linear guide rail
32 feeder cup

The invention claimed is:
1. A method for producing a bonded rare-earth magnet, the method comprising the steps of:
  providing a rapidly solidified rare-earth magnet alloy powder consisting of particles each having a flat shape, wherein a ratio of a minor axis size of the flat shape to a major axis size of the flat shape is 0.3 or less and wherein a 50 mass % particle size of the rapidly solidified rare-earth magnet alloy powder is within a range of 75 μm to 105 μm;
  providing a solution in which a resin that is in solid phase at room temperature is dissolved in an organic solvent;
  mulling the rapidly solidified rare-earth magnet alloy powder and the solution together and vaporizing the organic solvent, thereby making a bonded rare-earth magnet compound in which magnet powder particles that form the rapidly solidified rare-earth magnet alloy powder are coated with the resin, wherein each particle contained in the bonded rare-earth magnet compound has the flat shape, wherein the ratio of the minor axis size of the flat shape to the major axis size of the flat shape is 0.3 or less, and wherein the 50 mass % particle size of the rapidly solidified rare-earth magnet alloy powder coated with the resin is within the range of 75 μm to 105 μm;
  making a compressed compact by compressing the bonded rare-earth magnet compound under a pressure of 1000 MPa to 2500 MPa; and
  thermally treating the compressed compact to form a bonded rare-earth magnet having a density of approximately 6.4 to 6.6 g/cm³, wherein
  if the rapidly solidified rare-earth magnet alloy powder to be mulled is 100 mass %, the solution includes 0.4 mass % to 1.0 mass % of the resin and 1.2 mass % to 20 mass % of the organic solvent, the resin including a curing agent,
  in the bonded rare-earth magnet compound, the resin including the curing agent coats the magnet powder particles at a coverage of 90% or more,
  the resin including the curing agent that coats the magnet powder particles has a thickness of 0.1 μm to 1 μm, and
  a gap between adjacent ones of the magnet powder particles each having the flat shape is 2 μm or less as measured in a cross section parallel to a compressing direction.

2. The method of claim 1, comprising the steps of:
subjecting the compressed compact to a barrel process after the step of thermally treating;
dipping the compressed compact that has been subjected to the barrel process in a resin solution that has been diluted with an organic solvent and that includes 2 to 13 mass % of thermosetting resin component; and
removing the compressed compact from the resin solution and drying the compressed compact.

3. The method of claim 1, wherein the compressed compact is made by compressing the bonded rare-earth magnet compound under a pressure of 1960 MPa to 2500 MPa.

4. A method for producing a bonded rare-earth magnet, the method comprising the steps of:
providing a rapidly solidified rare-earth magnet alloy powder consisting of particles each having a flat shape, wherein a ratio of minor axis size of the flat shape to a major axis size of the flat shape is 0.3 or less, and wherein a 50 mass % particle size of the rapidly solidified rare-earth magnet alloy powder is within a range of 75 μm to 105 μm;
providing a solution in which a resin that is in solid phase at room temperature is dissolved in an organic solvent;
mulling the rapidly solidified rare-earth magnet alloy powder and the solution together and vaporizing the organic solvent, thereby making a bonded rare-earth magnet compound in which magnet powder particles that form the rapidly solidified rare-earth magnet alloy powder are coated with the resin, wherein each particle contained in the bonded rare-earth magnet compound has the flat shape, wherein the ratio of the minor axis size of the flat shape to the major axis size of the flat shape is 0.3 or less, and wherein the 50 mass % particle size of the rapidly solidified rare-earth magnet alloy powder coated with the resin is within the range of 75 μm to 105 μm;
making a compressed compact by compressing the bonded rare-earth magnet compound under a pressure of 1000 MPa to 2500 MPa; and
thermally treating the compressed compact to form a bonded rare-earth magnet having a density of approximately 6.4 to 6.6 g/cm$^3$, the bonded magnet having a mechanical strength of 30 MPa or more, wherein
if the rapidly solidified rare-earth magnet alloy powder to be mulled is 100 mass %, the solution includes 0.4 mass % to 1.0 mass % of the resin and 1.2 mass % to 20 mass % of the organic solvent, the resin including a curing agent,
in the bonded rare-earth magnet compound, the resin including the curing agent coats the magnet powder particles at a coverage of 90% or more,
the resin including the curing agent that coats the magnet powder particles has a thickness of 0.1 μm to 1 μm, and
a gap between adjacent ones of the magnet alloy powder particles each having the flat shape is 2 μm or less as measured in a cross section parallel to a compressing direction.

5. The method of claim 4, wherein the compressed compact is made by compressing the bonded rare-earth magnet compound under a pressure of 1960 MPa to 2500 MPa.

6. A method for producing a bonded rare-earth magnet, the method comprising the steps of:
providing a rapidly solidified rare-earth magnet alloy powder consisting of particles each having a flat shape, wherein a ratio of minor axis size of the flat shape to a major axis size of the flat shape is 0.3 or less, and wherein a 50 mass % particle size of the rapidly solidified rare-earth magnet alloy powder is within a range of 75 μm to 105 μm;
providing a solution in which a resin that is in solid phase at room temperature is dissolved in an organic solvent;
mulling the rapidly solidified rare-earth magnet alloy powder and the solution together and vaporizing the organic solvent, thereby making a bonded rare-earth magnet compound in which magnet powder particles that form the rapidly solidified rare-earth magnet alloy powder are coated with the resin, wherein each particle contained in the bonded rare-earth magnet compound has the flat shape, wherein the ratio of the minor axis size of the flat shape to the major axis size of the flat shape is 0.3 or less, and wherein the 50 mass % particle size of the rapidly solidified rare-earth magnet alloy powder coated with the resin is within the range of 75 μm to 105 μm;
making a compressed compact by compressing the bonded rare-earth magnet compound under a pressure of 1000 MPa to 2500 MPa; and
thermally treating the compressed compact to form a bonded rare-earth magnet having a density of approximately 6.4 to 6.6 g/cm$^3$, the bonded magnet having an electrical resistance of 1600 μΩ·m or more, wherein
if the rapidly solidified rare-earth magnet alloy powder to be mulled is 100 mass %, the solution includes 0.4 mass % to 1.0 mass % of the resin and 1.2 mass % to 20 mass % of the organic solvent, the resin including a curing agent,
in the bonded rare-earth magnet compound, the resin including the curing agent coats the magnet powder particles at a coverage of 90% or more,
the resin including the curing agent that coats the magnet powder particles has a thickness of 0.1 μm to 1 μm, and
a gap between adjacent ones of the magnet alloy particles each having the flat shape is 2 μm or less as measured in a cross section parallel to a compressing direction.

7. The method of claim 6, wherein the bonded magnet has a mechanical strength of 30 MPa or more.

8. The method of claim 6, wherein the compressed compact is made by compressing the bonded rare-earth magnet compound under a pressure of 1960 MPa to 2500 MPa.

* * * * *